United States Patent [19]
de Jong

[11] 3,743,873
[45] July 3, 1973

[54] SYNCHRONOUS ELECTRIC MACHINE
[75] Inventor: Henricus Cornelis Johannes de Jong, Hengelo, Netherlands
[73] Assignee: Heemaf N.V., Hengelo, Netherlands
[22] Filed: Dec. 20, 1971
[21] Appl. No.: 209,614

[30] Foreign Application Priority Data
Jan. 22, 1971 Netherlands.................... 7100855

[52] U.S. Cl.................. 310/165, 310/114, 310/156
[51] Int. Cl. ........................................ H02k 19/12
[58] Field of Search................... 310/45, 162, 163, 310/164, 165, 156, 113, 114

[56] References Cited
UNITED STATES PATENTS
| | | | |
|---|---|---|---|
| 3,614,496 | 10/1971 | Schiethart | 310/162 |
| 3,492,520 | 1/1970 | Yates | 310/156 |
| 3,495,113 | 2/1970 | Haydon | 310/156 |
| 2,927,229 | 3/1960 | Merrill | 310/211 |
| 2,863,077 | 12/1958 | Morrill | 310/156 |

*Primary Examiner*—R. Skudy
*Attorney*—John P. Snyder et al.

[57] ABSTRACT

A synchronous electric machine having a stator is provided with a polyphase winding producing a rotating magnetic filed and an annular D.C. winding to produce a coaxial steady field. Sets of rotor poles are disposed in axially spaced transverse planes and permanent magnets consisting of ceramic material of high coercivity and having radially inner and outer faces of opposite polarity are disposed in each transverse plane between the poles, the polarity of the radially outer faces of the permanent magnets being opposed to that induced in adjacent poles by the D.C. winding.

7 Claims, 7 Drawing Figures

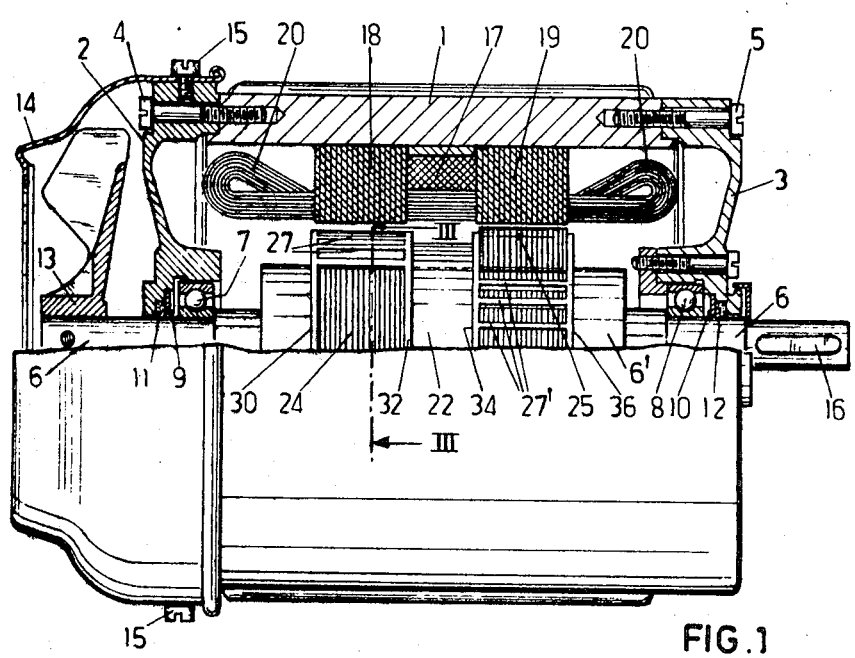
FIG.1
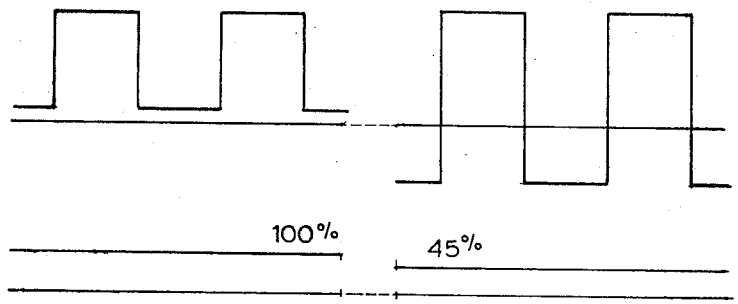
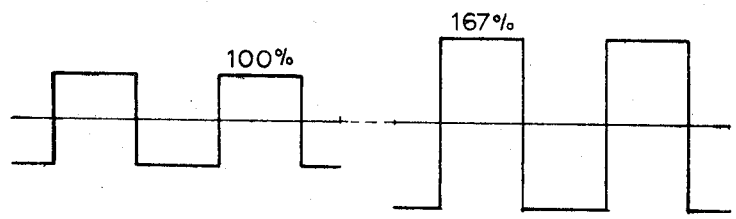
FIG.2a    FIG.2b

SYNCHRONOUS ELECTRIC MACHINE

This invention relates to a synchronous electric machine comprising a stator provided with a polyphase winding and an annular winding to produce a co-axial steady field and a rotor, the poles of which are disposed in axially spaced transverse planes. A machine of this kind is disclosed in U.S. Pat. No. 3,614,496.

The object of the invention is to improve the known machine by increasing the useful flux. To this end, according to the invention, permanent magnets having the same polarity in the radial direction are disposed in each transverse plane between the poles, the polarity being opposed to that of the poles. The result is a machine having a favorable ratio between the useful flex and the emerging flux, the latter term being used to denote the flux extending through the housing and the rotor shaft.

The permanent magnets may be constructed either in the form of segments of a circle or be plate-shaped. A plate-shaped magnet can be covered by a soft-iron pole shoe, the flux being increased by making the axial length of the plate greater than the length of the stack of rotor laminations. In the case of a plate-shaped magnet, the distance to the edge of the stack of rotor laminations is greater than in the case of a magnet in the form of a segment of a circle adapted to the rotor shape. To limit the leakage flux, when plate-shaped magnets are used, it is preferable to form the stack of rotor laminations with an opening on either side of each magnet.

The invention will be explained in detail with reference to exemplified embodiments.

FIG. 1 is a longitudinal section through a machine according to the invention;

FIG. 2a diagrammatically illustrates the value of the various flux components in the case of a machine without permanent magnets while;

FIG. 2b shows the value of the various flux components in the case of a machine with permanent magnets.

FIG. 3b is a longitudinal section and partial elevation of the rotor shown in FIG. 3a;

FIG. 4b is a longitudinal section and partial elevation of the rotor shown in FIG. 4a.

Figure 3A:
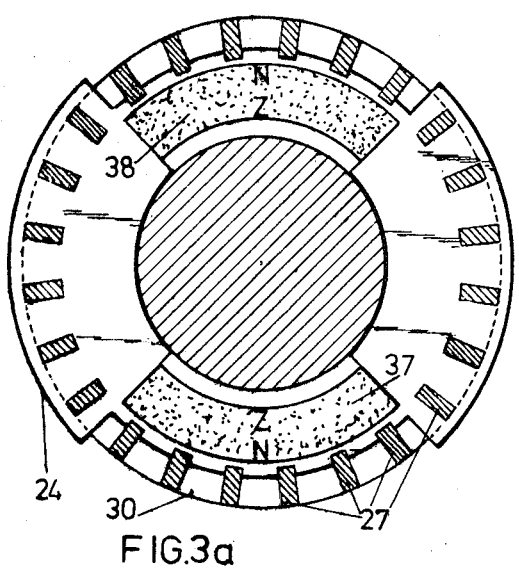
FIG. 3a is a cross-section on the line III—III in FIG. 1.
Figure 3B:
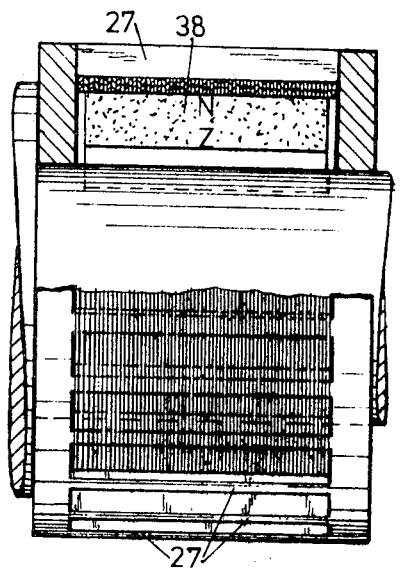

The stationary part or the stator of the motor comprises a sub-stantially cylindrical housing 1, with plates 2 and 3 at either end. The plates 2, 3 are connected to the housing 1 by bolts 4, 5 and have bores for the passage of the rotor shaft 6. The shaft 6 is mounted in the plates 2 and 3 by ballbearings 7, 8 respectively which are closed by rings 9, 10 respectively. The felt ring 11 is disposed between the ring 9 and the plate 2 and a felt ring 12 is disposed between the ring 10 and the plate 3. The left-hand part of the shaft in the drawing has a bladed wheel 13 which acts as a fan and which is shielded by a plate 14 secured by bolts 15 to the housing 1. A keyway 16 is formed in the right-hand part of the shaft. The D.C. winding 17 energizes the motor. Laminated stator cores 18 and 19 are disposed on either side of a spacer ring surrounding the winding 17 and have a single-phase or poly-phase winding 20. The winding 20 is constructed from coils or groups of coils whose circumferential dimensions are substantially equivalent to the pole pitch of different polarity as disclosed in copending application Ser. No. 131,596, filed Apr. 6, 1971 and assigned in common herewith. An alternating or rotating field is produced by means of the winding 20.

The two end portions of the shaft 6 consist of non-magnetizable material, while the larger-diameter middle part 6' consists of magnetizable material. Laminated poles provided with cages are disposed on the middle part in two axially spaced planes. The left-hand cage in the drawing, comprising bars 27, is axially bounded by rings 30 and 32 respectively, while the bars 27' of the right-hand cage end in the rings 34 and 36 respectively. A stack of laminations which forms a pole is disposed between each pair of rings. Each stack of laminations comprises an annular main member and one or more radially projecting parts which form the actual poles 23, 24, and 25, 26 respectively.

The outside of the main pole member is grooved to receive the innermost parts of the bars 27 and 27'. The axial width of the poles corresponds to that of the associated stator cores 18 and 19. A spacer ring 22 of magnetizable material is disposed on the central part 6' between the two poles and determines the required spacing between the poles.

The concentric excitation winding 17 carries direct current during operation and produces an axially directed steady field in the housing and in the shaft, said field being closed by the stator cores and the poles. The polarity of the poles is determined by the direction of said field. In addition to the low power consumption, namely under no-load conditions, as already mentioned, an important advantage of the motor is that a controllable field can be produced without co-rotating windings and slip rings and brushes. According to the invention, permanent magnets 37, 38 (FIG. 3a) are disposed between the poles on the rotor. The spacing between the permanent magnets 37, 38 as far as the bottom of the rotor slot should be kept small in order to limit the leakage flux. The axial length of the magnets 37, 38 is substantially equal to that of the rotor laminations.

Figure 4A:
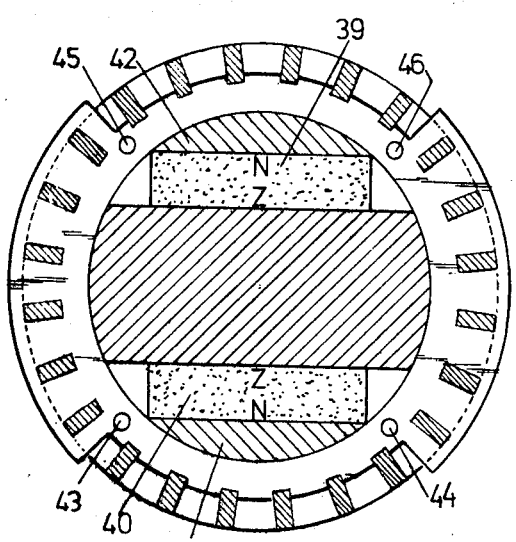
FIG. 4a is a cross-section through a rotor having plate-shaped magnets.
Figure 4B:
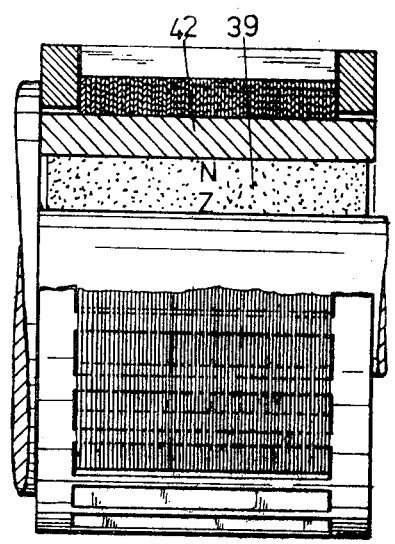

FIG. 2a diagrammatically illustrates the value of the emerging flux and the useful flux together with the total flux for one half of the machine without the provision of permanent magnets. It has been assumed that the flux in the space between the poles is 10 percent of the flux beneath the poles. By the provision of the permanent magnets, the flux in the between-pole space becomes 55 percent with the opposite sign, it being assumed that about 50 percent of the excitation flux can be obtained with ceramic material. By the provision of the permanent magnets, the useful flux increases from 45 to 75 percent, i.e., a 67 percent increase, while the emerging flux drops from 45 to 25 percent, i.e., a drop of 55 percent. The values obtained are given in FIG. 2b. In the embodiment shown in FIG. 4a, the permanent magnets are constructed as plates 39, 40 covered by soft iron pole shoes 41, 42. In order to reduce the flux leakage, openings 43, 44 and 45, 46 are formed on either side of the magnets. The axial length of the magnets 39, 40 is greater than that of the set of rotor laminations.

The advantages of the provision of permanent magnets in the case of generator operation are an improvement to dynamic behavior, for example in the case of load surges, since the flux is reduced through the housing and the shaft.

The permanent magnets 37, 38 and 39, 40 respectively induce voltages and currents in the winding 20 during asynchronous starting. Since these are disturbing, for example due to coupling pulsation, this effect can be obviated by energizing the excitation winding in such manner that the induced voltages become zero.

What I claim is:

1. A synchronous A.C. motor comprising, in combination:

a housing having a pair of axially spaced core members disposed therein;

D.C. winding means disposed between said core members for establishing a closed D.C. magnetic field extending axially within said housing and passing radially through said core members;

A.C. winding means extending through said core members and circumferentially of said housing for establishing a rotating magnetic field within said housing;

a rotor journalled in said housing concentrically of said core members and said winding means, said rotor including a shaft having opposite end portions formed of non-magnetizable material and an intermediate portion joining said opposite end portions which is of magnetizable material, said intermediate portion of the shaft being surrounded by said core members and being of an axial length to extend therebeyond, said rotor also including a pair of squirrel cage winding means fixed to said intermediate portion of the shaft, each said squirrel cage winding means including circumferentially spaced electrically conducting bars and axially spaced end rings between which said bars extend and which end rings are disposed in planes substantially straddling a respective core member and a pole piece disposed between said end rings, each pole piece presenting a plurality of radially projecting poles through which some of said conducting bars extend and said poles being separated by circumferentially equidistant radially recessed portions whereby said D.C. winding means induces said D.C. magnetic field to pass axially through said intermediate portion of the shaft and radially through said said poles to said core members; and a plurality of permanent magnets disposed within each squirrel cage winding, one of said permanent magnets being disposed in each of said radially recessed portions of said pole pieces and presenting radially inner and outer surfaces of opposite polarity in which the radially outer surface of each permanent magnet is of polarity opposite to that induced by said D.C. winding means in the poles of that squirrel cage winding with which such permanent magnet is associated.

2. A synchronous electric machine according to claim 1, characterized in that the permanent magnets are in the form of segments of a circle.

3. A synchronous electric machine according to claim 1, characterized in that the permanent magnets are plate-shaped and are each bounded by a soft-iron pole shoe having the shape of a segment of a circle.

4. A synchronous electric machine according to claim 1, characterized in that the axial length of the permanent magnet is greater than that of the squirrel cage winding means.

5. A synchronous electric machine according to claim 1, characterized in that the permanent magnets consist of ceramic material of high coercivity.

6. A synchronous electric machine according to claim 3 characterized in that axially extending openings are formed in each pole piece adjacent the end regions of said radially recessed portions.

7. A synchronous electric motor comprising, in combination:

a housing having a pair of axially spaced annular core members therein;

annular D.C. winding means disposed between said core members for establishing a closed D.C. magnetic field extending axially within said housing and passing radially through said core members;

A.C. winding means extending through said core members and circumferentially of said housing for establishing a rotating magnetic field within said housing;

a rotor journalled in said housing concentrically of said core members and of said winding means, said rotor including a pair of axially spaced squirrel cage winding means disposed in registry respectively with said core members and each including an annular pole piece having circumferentially spaced radially projecting poles defining recessed regions therebetween, the poles of one squirrel cage winding means being disposed in axial alignment with the recessed regions of the other squirrel cage winding means, said rotor also including a shaft intermediate portion of magnetizable material projecting through both said squirrel cage winding means and upon which said annular pole pieces are engaged; and a permanent magnet associated with each of said recessed regions, each permanent magnet having radially spaced inner and outer surfaces of opposite polarity in which the inner surface is disposed in close proximity to said shaft intermediate portion and the outer surface is of polarity opposite to that induced in the associated pole piece by said D.C. magnetic field.

* * * * *